United States Patent [19]

Keely

[11] 3,719,502

[45] March 6, 1973

[54] APPARATUS AND METHOD FOR HYDROKINETICALLY COOKING LEGUMES

[75] Inventor: Richard Thomas Keely, Grand Rapids, Mich.

[73] Assignee: J. P. Burroughs & Son, Inc., Saginaw, Mich.

[22] Filed: Sept. 18, 1969

[21] Appl. No.: 859,075

[52] U.S. Cl. ...........................99/98, 99/1, 99/325, 99/330, 165/39
[51] Int. Cl. ......................A23l 1/20, A23l 3/34
[58] Field of Search..........99/98, 404, 325, 326, 327, 99/328, 329, 330, 100, 1, 100 P; 165/39; 34/169

[56] References Cited

UNITED STATES PATENTS 2,229,609  1/1941  Nicholoy..................................99/98
2,057,366  10/1936  Chapman..........................99/404 X
2,584,150  2/1952  Morris.....................................99/98

OTHER PUBLICATIONS

Perry's Chemical Engineers' Handbook, McGraw-Hill New York 1963 p. 22–106

Primary Examiner—A. Louis Monacell
Assistant Examiner—William A. Simons
Attorney—Learman, Learman & McCulloch

[57] ABSTRACT

The continuous preparation of legumes comprising the forming of an aqueous slurry of legumes, and then cooking the legumes by passing the slurry through a conduit with a predetermined pressure and at a predetermined temperature. Apparatus is provided for regulating the pressure within the conduit and the temperature of the slurry in the conduit. The slurry preferably is formed so that the weight of the legumes does not exceed the weight of the slurry water.

14 Claims, 1 Drawing Figure

PATENTED MAR 6 1973
3,719,502
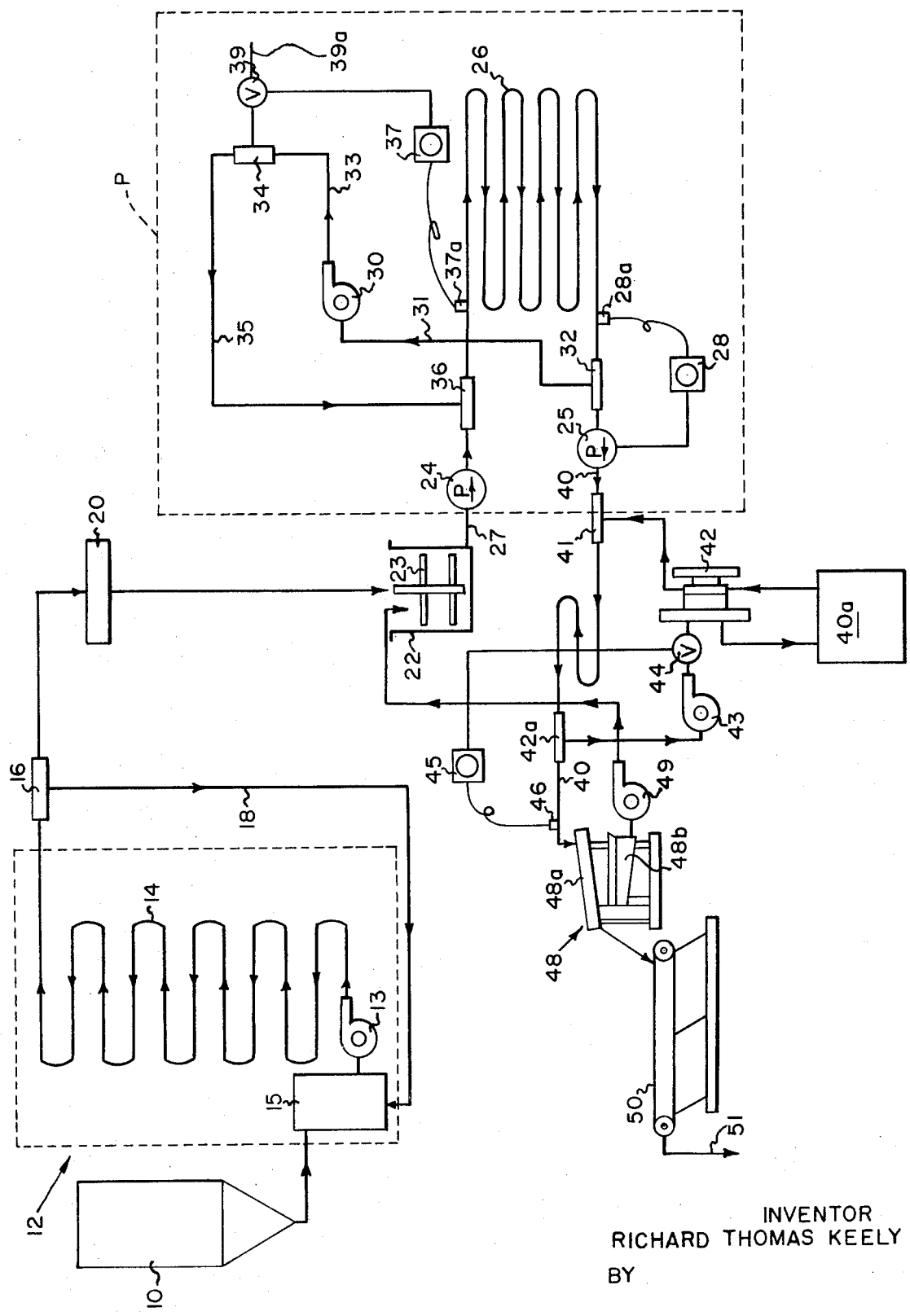
INVENTOR
RICHARD THOMAS KEELY
BY
Learman, Learman & McCulloch the heater 34 where it is heated to a temperature sufficient to maintain the slurry in the pipe 26 at a temperature of approximately 240° F. The heated water then is reintroduced into the pipe 26 where it is mixed with the slurry. The temperature of the slurry in the pipe 26 is sensed by a temperature sensor 38 connected to a temperature controller 40 which is connected to and controls the output of the heater 34.

APPARATUS AND METHOD FOR HYDROKINETICALLY COOKING LEGUMES

This invention relates to methods and apparatus for preparing precooked legumes such as beans and the like and more particularly relates to methods and apparatus for cooking legumes by continuously passing a continuously heated slurry of legumes through a closed, pressurized system.

In recent years, there has been an ever-increasing demand for precooked legumes such as beans and the like. The precooking of raw legumes affords the consumer the advantage of not having to soak the legumes for long periods of time, e.g., 8 hours, prior to cooking. The consumer needs merely to heat the precooked legumes in water for approximately 20 minutes, during which time the legumes will rehydrate and be edible and palatable with uniform texture and flavor. In the past, the preparation of precooked legumes has been accomplished by cooking the legumes by the batch method wherein pans of legumes are placed in retorts, pressure cookers, and other such similar devices. Such processes are slow and result in low production.

An object of the present invention to provide methods and apparatus for preparing precooked legumes by continuously passing an aqueous slurry of legumes through a pressurized and heated system.

Another object of the invention is to provide methods and apparatus for preparing precooked legumes which rapidly will cook the legumes and yet result in a minimum amount of legumes having their skins broken.

Other objects and advantages of the present invention will become apparent when considered with the following description and accompanying drawing in which the single FIGURE is a schematic illustration of apparatus formed according to the invention.

According to the present invention precooked legumes are prepared by a continuous process comprising the forming of an aqueous slurry of beans, passing the slurry through a passage at a predetermined rate and maintaining the slurry in the passage at a temperature sufficient to cook the legumes. Preferably, the temperature of the slurry and the pressure in the conduit remain constant and the soaked legumes do not exceed the weight of the slurry water.

Apparatus constructed according to the disclosed embodiment of the invention is adapted for use with a storage bin 10 from which raw legumes such as navy beans may be discharged to water-soaking apparatus, shown generally at 12, comprising a blancher having a spiral pipeline 14. The raw legumes first are introduced into a water tank 15 containing water maintained at a temperature of 180° – 190° F. to form an aqueous slurry. The slurry is pumped through the spirally formed pipeline 14 by a suitable pump 13. The capacity of the pump and the length of pipeline 14 should be chosen so that the slurry requires twenty to 25 minutes to traverse the blancher. The hardness of the soaking water is predetermined for the type of product desired and should not be allowed to drop below 8 grains, with the optimum range being 8 – 10 grains. During this time, the legumes will be hydrated and gain approximately their own weight in water.

Upon emerging from the blancher the slurry is delivered to a dewatering reel of conventional construction and shown diagrammatically at 16, where the slurry water and the skins and splits are removed. If desired, the legumes may also be passed over a flume (not shown) which is fitted with traps and riffles to remove heavy, extraneous matter. Water from the reel 16 is recirculated to the tank 15 through a pipeline 18 where it is again used in soaking other legumes received from the storage tank 10. Fresh make-up water may be added to the tank 15 as needed by any suitable means. After dewatering, the soaked legumes pass over a grading belt, shown schematically at 20, where the discolored and otherwise inferior legumes are removed.

As thus far described, the apparatus is conventional and functions to deliver soaked, dewatered, graded legumes ready for precooking. Any apparatus capable of performing this function may be substituted for that disclosed.

The soaked legumes are delivered from the grader 20 to a tank 22 containing water at approximately 190° F. The water and legumes are mixed so as to form an aqueous slurry comprising a ratio, by weight, of not more than one part soaked legumes to one part slurry water. In establishing this ratio, the water which has soaked into the legume will be considered as part of the weight of the legume and not as part of the weight of the slurry water. The aqueous slurry of legumes thus formed is gently agitated by an agitator 23 located in tank 22 and connected to any suitable power source such as an electric motor (not shown).

Illustrated in broken lines at P is pressurized cooking apparatus through which the aqueous slurry will be passed. This apparatus constitutes a closed loop system and includes a pair of fluid pumps 24 and 25, connected to opposite ends of a conduit such as a pipe 26. Each of the pumps 24 and 25 is identical and may comprise a commercially available, single lobe, Waukesha Sanitary Pump with a variable drive speed control. A pipe 27, which may suitably have a 2-inch internal diameter, connects the tank 22 with the pump 24.

The pressure within the passage or pipe 26 is controlled by varying the speeds of the pumps 24 and 25. For example, by increasing the speed of the pump 24 while maintaining the speed of the pump 25 constant, the pressure within the pipe 26 may be increased. The speeds of the pumps 24 and 25 preferably are so regulated that the slurry traverses the pipe 26 in approximately 5 minutes.

The pressure within the pipe 26 is sensed by electrical pressure sensing means 28a of conventional construction and which is inserted downstream in the line 26 and connected to a known pressure controller 28. The speed of the pump 25 is controlled by the pressure controller 28 to maintain the pressure in the pipe 26 constant. Similar apparatus (not shown) could be connected to the pump 24 to regulate its speed.

Apparatus also is provided for regulating the temperature of the aqueous slurry in the pipe 26, and includes a system closed to atmosphere for recirculating the slurry water between portions 25 and 24 of the pipe 26. This apparatus includes a pump 30 connected by a tube 31 to the portion 32 of the pipe 26 and to a heater 34 by a pipe 33. The outlet of the heater 34 is connected to an inlet portion 36 of the pipe 26 by a pipe 35, upstream of the portion 32. The pump 30 is operable to bleed off slurry water at 30 and direct it through the heater 34 where it is reheated prior to returning to the pipe 26 at the inlet 36. Screened pipe sections 32 and 36 prevent the entry of legumes into the pipes 31 and 35 and mix water from the heater 34.

A valve 39 is mounted in a line 39a which connects the heater 34 to a suitable source (not shown) of steam to assist in raising the temperature of the recirculating water. The steam and water are mixed in the heater 34 before passing through the pipe 35.

Apparatus also is provided for sensing the temperature of the slurry and includes a temperature sensing probe 37a connected to the pipe 26 and operable to actuate a known temperature control unit 37 which, in turn, regulates the output of the steam control valve 39. In this manner, water in the slurry is continuously recirculated to maintain the temperature of the slurry substantially constant as it passes through the pipe 26 in which the legumes are cooked. Preferably, the temperature of the slurry in the apparatus P is maintained at substantially 240° F.

Because the heating apparatus constitutes a closed loop system, the weight ratio of soaked legumes to water in the pipe 26 remains substantially constant and does not exceed the one-to-one weight ratio of legumes to water. In this manner, breakage and splitting of the beans, which otherwise would occur due to friction, is minimized.

It has been found that the breaking and splitting of the skins of the legumes is related to the velocity of the slurry passing through the pipe 26. It has been determined that a slurry velocity of substantially 1.4 feet per second in a 2-inch pipe minimizes the breakage and splitting. Consequently, the length of the pipe 26 should be correlated with the speed of the pumps 24 and 25 and should be of sufficient length as to require about 5 minutes for the slurry to traverse the pipe 26. These criteria may be met if the pipe has an internal diameter of 2 inches and if the slurry is pumped through the pipe at the rate of 36 feet in 26 seconds while the temperature of the slurry is maintained at approximately 240° F. In apparatus of this character, approximately 2,500 pounds of beans per hour can be processed, utilizing 7,500 pounds of slurry water per hour.

Upon leaving the cooking stage P, the slurry passes through a tube 40 into a cooler and is cooled to 200° F. or less by the addition of cold water from a plate cooler 42. Upon leaving the cooling and depressurizing stage the pressure to which the slurry is subjected is reduced to atmospheric. The water for the cooler 42 is continuously bled off from the pipe 40 at 42a and recirculated therethrough by means of a recirculating pump 43. As the water passes through the plate cooler 42, a conventional freon chiller 40a will cool the recirculating water. A valve 44 is also connected in line with the pump 43 and the cooler 42, and is regulated by a temperature control unit 45 operating in response to a temperature sensing device 46 mounted on the pipe 40 to sense the temperature of the slurry passing therethrough after it leaves the cooler 42. The amount of cooling water thus recirculating between the points 42a and 41 will thus be regulated.

The cooling of the slurry following its discharge from the cooking stage prevents the "popping" or splitting of the legumes due to the sudden release of internal pressure. Because the cooling apparatus constitutes a closed loop system, the weight ratio of soaked legumes to water in the pipe remains constant and does not exceed the one to one ratio of soaked legumes to slurry water. This permits the legumes to be cooked continuously with maximum efficiency and a minimum of split legumes.

From the cooking and depressurizing stage the slurry passes through a dewatering station 48 at which is positioned an inclined shaking screen 48a and a water collection trough 48b. Water may be pumped from the trough 48b to the tank 22 by means of a recirculating pump 49 so that the water may be reused. Make-up water of the same hardness may also be added to the tank 22 if needed by a suitable supply, not shown.

From the dewatering station the legumes are delivered to a cooling conveyor 50 where they are cooled by air streams to dry surface moisture and reduce the temperature to approximately 100° F. This cooling also firms the legumes by setting the starch. The legumes thus may be conveyed mechanically immediately after they are cooked without substantial damage thereto.

Following the cooling operation on the conveyor 50, the legumes are passed to a conventionally available commercial dryer, indicated by the arrow 51, where the legumes are slowly and gently dried to prevent "butterflies" or excessive separation or spreading of the skin from the cotyledon. The drying temperature must not exceed 180°, and excessive temperature especially must be avoided in the first stage of the drying so that the outside of the legume does not dry faster than the inside. After emerging from the dryer, the legumes are delivered to a "precooler" where air at room temperature is blown over them until the temperature reaches approximately 100° F. This is the final step prior to packaging.

To summarize the foregoing, legumes such as beans are passed from the storage container 10 to the blancher 14 where they are soaked for a period of 20 – 25 minutes at a temperature of 180° – 190° F. Upon emerging from the blancher, the soaked beans pass through a dewatering station 16 and thence through an inspection station 20, where culls and extraneous material are removed. From the grading station the soaked beans are delivered to the supply tank 22 which contains water at substantially 190° F. An aqueous slurry is formed in the tank such that the weight ratio of soaked beans to water does not exceed one. From the tank 22, the slurry is pumped through the cooker P by pumps 24 and 25 at a substantially constant temperature and pressure and at a velocity of substantially 1.4 feet per second. As the slurry leaves the cooker P, it is cooled rapidly and then reduced to atmospheric pressure after it is cooled by water withdrawn at 42a and pumped into the slurry at 41. The slurry then passes through a dewatering station 48 where the excess water is drained off and returned to the supply tank 22. The cooked beans are passed on to the cooling conveyor 50 and then on to dryer 51 for further drying and final processing.

Thus, this method of precooking forms a discrete precooked legume that is stable and affords the consumer the advantage of a convenience food which is readily preparable for consumption. Each step of the process preserves the product so that the consumer is offered a discrete palatable product which has a uniform texture and a pleasing taste.

What I claim is:

1. A continuous process for preparing precooked food products comprising the steps of: adding the products to a first flow of heated water and moving them in a confined flow path of a length such that said products become substantially water-saturated and gain approximately their own weight in water; continuously then removing the products from the first flow of water and mixing the water-saturated heated products with a second liquid flow to form a slurry having a relative weight ratio wherein the products to second liquid proportion is less than about one to one; propelling said slurry as a confined stream through a cooking zone at a predetermined rate of travel such as to cause said slurry to traverse said zone in a predetermined time; and maintaining said stream while in said zone at a predetermined cooking temperature such as to cook said products in said predetermined time.

2. The process as set forth in claim 1 wherein the temperature in said cooking zone is regulated by separating a portion of the slurry liquid at the downstream end of said zone from the legumes and withdrawing it from the said confined stream; heating the withdrawn liquid; and reintroducing the heated liquid to the slurry at the upstream end of said zone while maintaining the ratio of soaked legumes to slurry liquid proceeding through the zone substantially constant.

3. The process of claim 1 in which said products are legumes.

4. The process as set forth in claim 1 wherein the slurry is passed through said cooking zone at a rate of substantially 1.4 feet per second.

5. The process as set forth in claim 1 wherein said slurry is subjected to a predetermined pressure in said cooking zone.

6. The process as set forth in claim 5 wherein the pressure to which said slurry is subjected in said cooking zone regulates the rate of travel of said slurry through said zone.

7. The process as set forth in claim 5 wherein the pressure and temperature in said cooking zone are substantially constant.

8. The process as set forth in claim 5 wherein the pressure within said zone is maintained substantially constant by varying the rate of admission of said slurry to said zone.

9. The process as set forth in claim 5 wherein the pressure within said zone is maintained substantially constant by varying the rate of discharge of said slurry from said zone.

10. A continuous process for preparing food products comprising: mixing the products with a conveying liquid to form a slurry; propelling said slurry as a continuously traveling confined stream through a cooking zone at a predetermined rate of travel and at a predetermined pressure such as to cause said slurry to traverse said zone in a predetermined time; maintaining said slurry at a predetermined temperature such as to cook said products in said predetermined time; propelling said slurry as a continuously traveling confined stream through a cooling zone at a predetermined rate of travel; detecting variations of temperature of the slurry in said cooling zone; and then separating a portion of the slurry liquid from the product, cooling the separated liquid and returning the cooled liquid to the slurry downstream from the cooking zone and upstream of the place of separation to cool the product while maintaining a substantially constant ratio of product to slurry liquid.

11. A continuous process for preparing food products, comprising the steps of: mixing said products with liquid to form a slurry; propelling said slurry as a continuously traveling confined stream through a cooking zone at a predetermined rate of travel such as to cause said slurry to traverse said zone in a predetermined time and while maintaining said slurry at a predetermined product cooking temperature; detecting variations of temperature in said slurry in the cooking zone; separating a portion of the liquid from the heated product therein and removing it, heating the removed liquid for a length of time dependent on the temperature variation sensed; and returning the heated liquid to the slurry in the cooking zone while maintaining a substantially constant ratio of product to slurry liquid.

12. Apparatus for preparing food products comprising: means for mixing the products with liquid to form a slurry; cooking means communicating with said mixing means for receiving said slurry as a continuously traveling confined stream; means for propelling said slurry through said cooking means at a predetermined rate of travel; and means for maintaining said slurry at a predetermined cooking temperature comprising sensing means for detecting variations of temperature in said slurry, means for separating the heated product from a portion of the liquid in said slurry and removing the separated portion of the liquid from the slurry, means for heating the removed liquid responsive to said variations, and means for returning the heated liquid to said slurry upstream of the place of removal and cooking means while maintaining a substantially constant ratio of products to slurry liquid in the slurry.

13. The combination defined in claim 12 in which a pump is provided just upstream of the place of return of the heated slurry portion for pumping slurry to the cooking unit and a second pump is provided just downstream of the place of removal of the slurry portion; and means is provided downstream of the second pump for cooling the slurry and the legumes therein, removing the legumes from the slurry liquid, and recirculating the liquid back to the first pump.

14. The apparatus defined in claim 12 in which means is provided for separating a portion of the liquid in the slurry from the product downstream of the cooking means, cooling the separated liquid, and returning it to the slurry upstream of the place of removal.

* * * * *